US011265938B2

(12) United States Patent
Ayaz et al.

(10) Patent No.: US 11,265,938 B2
(45) Date of Patent: Mar. 1, 2022

(54) DEVICES AND METHODS FOR COMMUNICATION IN A WIRELESS COMMUNICATION NETWORK

(71) Applicant: Huawei Technologies Co., Ltd., Shenzhen (CN)

(72) Inventors: Serkan Ayaz, Munich (DE); Daniel Medina, Munich (DE); Prajwal Keshavamurthy, Munich (DE); Markus Martin Dillinger, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 64 days.

(21) Appl. No.: 16/698,748

(22) Filed: Nov. 27, 2019

(65) Prior Publication Data
US 2020/0100306 A1 Mar. 26, 2020

Related U.S. Application Data

(63) Continuation of application No. PCT/EP2017/063050, filed on May 30, 2017.

(51) Int. Cl.
H04W 76/14 (2018.01)
H04W 4/40 (2018.01)
(Continued)

(52) U.S. Cl.
CPC ............ H04W 76/14 (2018.02); H04W 4/40 (2018.02); H04W 8/005 (2013.01); H04W 72/02 (2013.01);
(Continued)

(58) Field of Classification Search
CPC ..... H04W 76/14; H04W 76/27; H04W 76/00; H04W 8/005; H04W 72/02;
(Continued)

(56) References Cited

U.S. PATENT DOCUMENTS

2008/0253773 A1   10/2008  Zheng
2015/0223106 A1*  8/2015  Van Phan ............ H04W 76/19
                                              370/225
(Continued)

FOREIGN PATENT DOCUMENTS

CN    1980295 A    6/2007
CN    1988490 A    6/2007
(Continued)

OTHER PUBLICATIONS

Brenner et al., "The Open Mobile Alliance, Delivering Service Enablers for Next-Generation Applications," total 33 pages, John Wiley and Sons, Ltd (Jan. 2008).
(Continued)

Primary Examiner — Farid Seyedvosoghi
(74) Attorney, Agent, or Firm — Leydig, Voit & Mayer, Ltd,

(57) ABSTRACT

An apparatus, a method, and a computer readable medium are provided. The apparatus is configured to transmit and/or receive control plane signaling related to the control of radio resources of a sidelink communication system to/from a user equipment (UE), wherein the control plane signaling is carried over a user plane, in particular through IP encapsulation, of a second communication system between the apparatus and the UE. Moreover, embodiments of the disclosure relate to a corresponding UE as well as corresponding methods.

17 Claims, 11 Drawing Sheets

(51) Int. Cl.
*H04W 76/27* (2018.01)
*H04W 8/00* (2009.01)
*H04W 72/02* (2009.01)
*H04W 72/12* (2009.01)
*H04W 88/04* (2009.01)
*H04W 92/18* (2009.01)
*H04W 84/04* (2009.01)

(52) U.S. Cl.
CPC ... *H04W 72/1205* (2013.01); *H04W 72/1278* (2013.01); *H04W 76/27* (2018.02); *H04W 88/04* (2013.01); *H04L 2212/00* (2013.01); *H04W 84/042* (2013.01); *H04W 92/18* (2013.01)

(58) Field of Classification Search
CPC ......... H04W 72/1205; H04W 72/1278; H04W 88/04; H04W 4/40; H04W 84/042; H04W 92/18; H04W 88/18; H04W 88/08; H04W 92/045; H04L 2212/00
See application file for complete search history.

(56) References Cited

U.S. PATENT DOCUMENTS

| | | | |
|---|---|---|---|
| 2016/0081115 A1* | 3/2016 | Pang | H04W 56/001 370/329 |
| 2016/0165646 A1* | 6/2016 | Lee | H04L 43/0811 455/436 |
| 2017/0353914 A1* | 12/2017 | Jung | H04W 48/18 |
| 2019/0014563 A1* | 1/2019 | Lee | H04L 5/0053 |

FOREIGN PATENT DOCUMENTS

| | | |
|---|---|---|
| CN | 101299832 A | 11/2008 |
| EP | 3051736 A1 | 8/2016 |
| EP | 3148285 A1 | 3/2017 |
| WO | 2016122162 A1 | 8/2016 |
| WO | 2017051494 A1 | 3/2017 |
| WO | 2017052690 A1 | 3/2017 |

OTHER PUBLICATIONS

Säily et al., "Deliverable D6.2, 5G Asynchronous Control Functions and Overall Control Plane Design," Mobile and wireless communications Enablers for the Twenty-twenty Information Society-II, Version: v1.0, XP055443623, pp. 1-167, 5G Public-Private Partnership (5G-PPP) (Apr. 30, 2017).

"3rd Generation Partnership Project; Technical Specification Group Services and System Aspects; Study on security aspects for LTE support of V2X services (Release 14)," 3GPP TR 33.885 V1.1.0, pp. 1-86, 3rd Generation Partnership Project, Valbonne, France (Feb. 2017).

"3rd Generation Partnership Project; Technical Specification Group Services and System Aspects; Architecture enhancements for V2X services (Release 14)," 3GPP TS 23.285 V14.1.0, pp. 1-34, 3rd Generation Partnership Project, Valbonne, France (Dec. 2016).

"3rd Generation Partnership Project; Technical Specification Group Radio Access Network; Evolved Universal Terrestrial Radio Access (E-UTRA); Physical channels and modulation (Release 14)," 3GPP TS 36.211 V14.1.0, pp. 1-175, 3rd Generation Partnership Project, Valbonne, France (Dec. 2016).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.1.0, pp. 1-654, 3rd Generation Partnership Project, Valbonne, France (Dec. 2016).

* cited by examiner

DEVICES AND METHODS FOR COMMUNICATION IN A WIRELESS COMMUNICATION NETWORK

CROSS-REFERENCE TO RELATED APPLICATIONS

This application is a continuation of International Application No. PCT/EP2017/063050, filed on May 30, 2017, the disclosure of which is hereby incorporated by reference in its entirety.

TECHNICAL FIELD

In general, the present disclosure relates to the field of wireless communication. In particular, the disclosure relates to devices and methods for public land mobile network (PLMN)-independent management of vehicle-to-everything (V2X) sidelink communication.

BACKGROUND

In current long-term evolution (LTE) cellular networks supporting vehicle-to-everything (V2X) sidelink communication, the functions related to V2X sidelink (such as radio resource control (RRC), Medium Access Control (MAC), etc.) are generally controlled by a public land mobile network (PLMN) operator, also referred to as a mobile network operator (MNO). However, the future spectrum allocated for V2X sidelink communication may not belong to a specific PLMN operator (e.g., it may be shared by multiple PLMN operators). Therefore, V2X sidelink related functions may be outsourced to an external V2X sidelink operator that has no radio access network (RAN) or core network (evolved packet core (EPC)). Therefore, the question of adapting the current 3GPP Rel-14 V2X sidelink communication specifications to such an environment arises.

There are two modes of operation for V2X communication in 3GPP Rel-14, namely over the PC5 (sidelink) interface and over the LTE-uplink/downlink (LTE-Uu) interface. In the case of the sidelink mode of operation, which can also be referred to as V2X sidelink communication, the user equipment (UE or UEs) can communicate with each other directly over the PC5 interface. This communication mode is supported when the UE is served by the evolved universal terrestrial radio access network (E-UTRAN) and when the UE is outside of E-UTRAN coverage. Only the UEs authorized to be used for V2X services can perform V2X sidelink communication.

Generally, a UE supporting V2X sidelink communication can operate in two modes for resource allocation.

In the first resource allocation mode, which is referred to as scheduled resource allocation, the UE needs to be RRC_CONNECTED (i.e., in an RRC_CONNECTED state) in order to transmit data. Moreover, the UE requests transmission resources from the evolved node B (eNB), wherein the eNB schedules dedicated resources for transmission of sidelink control information (SCI) and data.

In the second resource allocation mode, which is referred to as UE autonomous resource selection, the UE on its own selects resources from resource pools and performs transport format selection to transmit SCI and data. The UE selects a resource pool based on the zone the UE is located in. Based on sensing, the UE can select or reselect specific sidelink resources and may reserve periodically recurring (i.e., semi-persistent) sidelink resources and may reserve periodically recurring (i.e. semi-persistent) sidelink resources.

In order to assist the eNB to provide sidelink resources, a UE in the RRC_CONNECTED state may report geographical location information to the eNB. The eNB can configure the UE to report the complete UE geographical location information based on periodic reporting.

Geographical zones can be configured by the eNB (e.g. SystemInformationBlockType21) or pre-configured (e.g. SL-V2X-Preconfiguration). When zones are configured, the world is divided into geographical zones using a single fixed reference point, zone length and zone width, from which the UE determines the identity of the zone it is located in.

The current 3GPP V2X sidelink architecture provides an operator-centric V2X sidelink solution. In particular, some limitations resulting from V2X sidelink related RAN functions being controlled by the PLMN operator are summarized in the following.

In mode 4, i.e. UE autonomous resource selection, different operators use different sl-V2X-ConfigCommon configurations (e.g., resource pools, zones, etc.). This is not a problem as long as UEs belonging to different operators use different carrier frequencies for V2X sidelink communication. However, if UEs belonging to different operators using different sl-V2X-ConfigCommon configurations are allowed to transmit on the same carrier frequency, then resource pool selection based on UE location within a zone is insufficient to avoid interference between UEs belonging to different operators. Thus, either the operators need to coordinate their sl-V2X-ConfigCommon configurations or a common PLMN-independent sl-V2X-ConfigCommon configuration is needed.

In mode 3, i.e. scheduled resource allocation, different operators use different sl-V2X-ConfigDedicated configurations and issue SL Grants based on a separate V2X sidelink scheduler. Again, this is not a problem as long as UEs belonging to different operators use different carrier frequencies for V2X sidelink communication. However, if UEs belonging to different operators use the same carrier frequency, scheduling needs to be done in a PLMN-independent way in order to guarantee orthogonality. Otherwise, transmissions scheduled by different operators may suffer from mutual interference. Thus, a common PLMN-independent V2X sidelink scheduler is needed in order to orthogonalize transmissions from all UEs. Consequently, a new mechanism is needed for the UE to request resources from a PLMN-independent network entity (v2x-CommTxResourceReq) as well as report bandwidth demand (SL BSR) and relevant measurements (measResults). Furthermore, the PLMN-independent network entity needs to perform V2X sidelink communication dedicated configuration (sl-V2X-ConfigDedicated), SPS configuration (SPS-Config), configure measurements to be performed and reported by the UE (measConfig) and issue dynamic and/or semi-persistent SL Grants to the UEs.

In order to manage V2X sidelink communication independently from the PLMN operator, a new set of protocols could be developed independently from 3GPP. However, this would require UE support of the new functionalities, so it cannot be used with 3GPP standard-compliant devices.

Thus, there is a need for improved devices and methods for managing V2X sidelink communication in a wireless communication network in a PLMN operator independent manner.

SUMMARY

It is an objective to provide for improved devices and methods for managing V2X sidelink communication in a wireless communication network in a PLMN operator independent manner.

According to a first aspect, the disclosure relates to an apparatus configured to transmit and/or receive control plane signaling related to the control of radio resources of a sidelink communication system to/from a user equipment, UE, wherein the control plane signaling is carried over a user plane, in particular through IP encapsulation, of a second communication system between the apparatus and the UE.

Thus, the apparatus according to the first aspect, which, for instance, could be implemented as a cloud server, performs management operation for sidelink communication, but is not part of a network operator. Thus, typically the apparatus according to the first aspect has no direct access to the mobile network operator's radio interface to communicate with the UE, but can use services by one or more operators to transmit information to the UE. Control plane signaling related to the control of radio resources of a sidelink communication system comprises signaling for RRC or MAC layer. The second communication system can be a WIFI, Bluetooth AP and/or mobile communication system based on 5G, LTE, UMTS, GSM, WIMAX, etc. The second communication system can be run by a specific mobile network operator. The sidelink communication system may be a part of the second communication system. Unicast communication can be based e.g. on a TCP/IP protocol. The apparatus according to the first aspect can be configured to communicate with more than one UE for managing the V2X sidelink communication thereof. In this case, the apparatus according to the first aspect can transmit additionally or alternatively multicast control plane signaling to the plurality of UEs and/or broadcast control plane signaling to all UEs of a pre-defined set of UEs. The sidelink communication system and/or the second communication system can be provided by network slices of one or more communication systems. These network slices can be controlled by a single or multiple operators.

In a further implementation form of the first aspect, the apparatus is configured to have access to address information of the UE and/or comprises address information of the UE. Address information can comprise any type of address.

In a further implementation form of the first aspect, the address information comprises information on one or more service access points of a radio resource control (RRC), of the UE. Address information can be a look-up table that maps information of a service access point of the UE depending on a content of the control plane signaling.

In a further implementation form of the first aspect, the address information is comprised in a pre-defined header format, in particular an IP header, an UDP header, and/or a TCP header.

A UE can be identified by a new header structure, a TCP or UDP port number, and/or an IP header, in particular a scrambled checksum of an IP header. The apparatus according to the first aspect can be configured to encapsulate and/or decapsulate sidelink related evolved packet core (EPC) signaling messages, in particular unmodified standardized signaling messages related to user authorization and/or security related parameters, in particular keys and/or certificates, within/from a higher layer message, in particular a TCP/IP packet.

To this end, the apparatus according to the first aspect could be configured to use one or more of the following security mechanisms: IP layer security through usage of IPsec, transport layer security through usage of TLS, application layer security through application layer VPN tunnels. All unicast messages exchanged between the apparatus according to the first aspect and the UE can be protected by any (or all) of the above mentioned protocols. For the multicast case, there could be a shared secret between all UEs belonging to that group and the apparatus according to the first aspect (a kind of group shared secret key) and messages can be protected by this shared secret. This protection again could be implemented at the IP layer, the transport layer or the application layer.

In a further implementation form of the first aspect, the address information comprises an identifier for identifying a subsystem of the UE. A subsystem of the UE can be a sidelink-related PHY, MAC, RRC, and/or subsystems of the UE related to higher layer information.

In a further implementation form of the first aspect, the apparatus is configured to transmit and/or receive control plane signaling from/to the UE over a user plane of a third communication system. The apparatus according to the first aspect can transmit a first control plane information to the UE over the second communication system and receive a second control plane information over a third communication system, or vice versa. Thereby, advantageously, control plane information for the sidelink communication system can be exchanged over different operators.

In a further implementation form of the first aspect, the apparatus comprises: an IP unit configured to encapsulate standardized configuration information elements for V2X sidelink communication within an IP packet and to transmit the IP packet to the UE over IP; a RRC unit configured to generate standard configuration information elements for V2X sidelink communication; and a RRC controller configured to control mode-4 configuration parameters, i.e. configuration parameters related to the UE autonomous resource selection mode.

In a further implementation form of the first aspect, the apparatus comprises an IP unit, a RRC unit, a RRC/MAC controller and a MAC unit, wherein: the RRC/MAC controller is configured to control mode-3 configuration parameters, i.e. configuration parameters related to the scheduled resource allocation mode; the RRC entity is configured to generate standard configuration information elements for V2X sidelink communication from information generated by the RRC/MAC controller and to provide to the RRC/MAC controller information derived from received V2X sidelink communication related messages from the UE; the MAC entity is configured to provide buffer status information to the RRC/MAC controller and to generate standard SL Grants based on sidelink radio resource allocation information received from the RRC/MAC controller; and the IP entity is configured to encapsulate and/or decapsulate RRC and MAC messages related to V2X sidelink communication.

According to a second aspect, the disclosure relates to a corresponding method of operating an apparatus configured to transmit and/or receive control plane signaling related to the control of radio resources of a sidelink communication system to/from a user equipment, UE, wherein the method comprises the step of carrying control plane signaling over a user plane, in particular through IP encapsulation, of a second communication system between the apparatus and the UE.

The method according to the second aspect can be performed by the apparatus according to the first aspect. Further features of the method according to the second aspect result directly from the functionality of the apparatus according to the first aspect and its different implementation forms.

According to a third aspect, the disclosure relates to a user equipment, UE, configured to transmit and/or receive control plane signaling related to the control of radio resources of a sidelink communication system to/from an apparatus according to the first aspect as such or any of its implementation forms, wherein the control plane signaling is carried over a user plane, in particular through IP encapsulation, of a second communication system between the UE and the apparatus.

In a further implementation form of the third aspect, the UE is configured to provide access information of the UE to the apparatus.

In a further implementation form of the third aspect, the address information comprises information on one or more service access points of a radio resource control (RRC), of the UE.

In a further implementation form of the third aspect, the address information is comprised in a pre-defined header format, in particular an IP header, an UDP header, and/or a TCP header.

In a further implementation form of the third aspect, the address information comprises an identifier to identify a subsystem of the UE.

In a further implementation form of the third aspect, the UE is configured to transmit and/or receive control plane signaling from/to the apparatus over a user plane of a third communication system.

According to a fourth aspect, the disclosure relates to a corresponding method of operating a user equipment, UE, configured to transmit and/or receive control plane signaling related to the control of radio resources of a sidelink communication system to/from an apparatus according to the first aspect, wherein the method comprises the step of carrying control plane signaling over a user plane, in particular through IP encapsulation, of a second communication system between the UE and the apparatus.

The method according to the fourth aspect can be performed by the user equipment according to the third aspect. Further features of the method according to the fourth aspect result directly from the functionality of the user equipment according to the third aspect and its different implementation forms.

According to a fifth aspect, the disclosure relates to a computer program comprising a program code for performing the method of the second aspect or the method of the fourth aspect when executed on a computer or a processor.

Embodiments of the invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which embodiments of the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Before describing in detail different embodiments of the invention, in the following, some further technical background will be provided, which can be helpful for understanding different aspects of the present invention.

Figure 1:
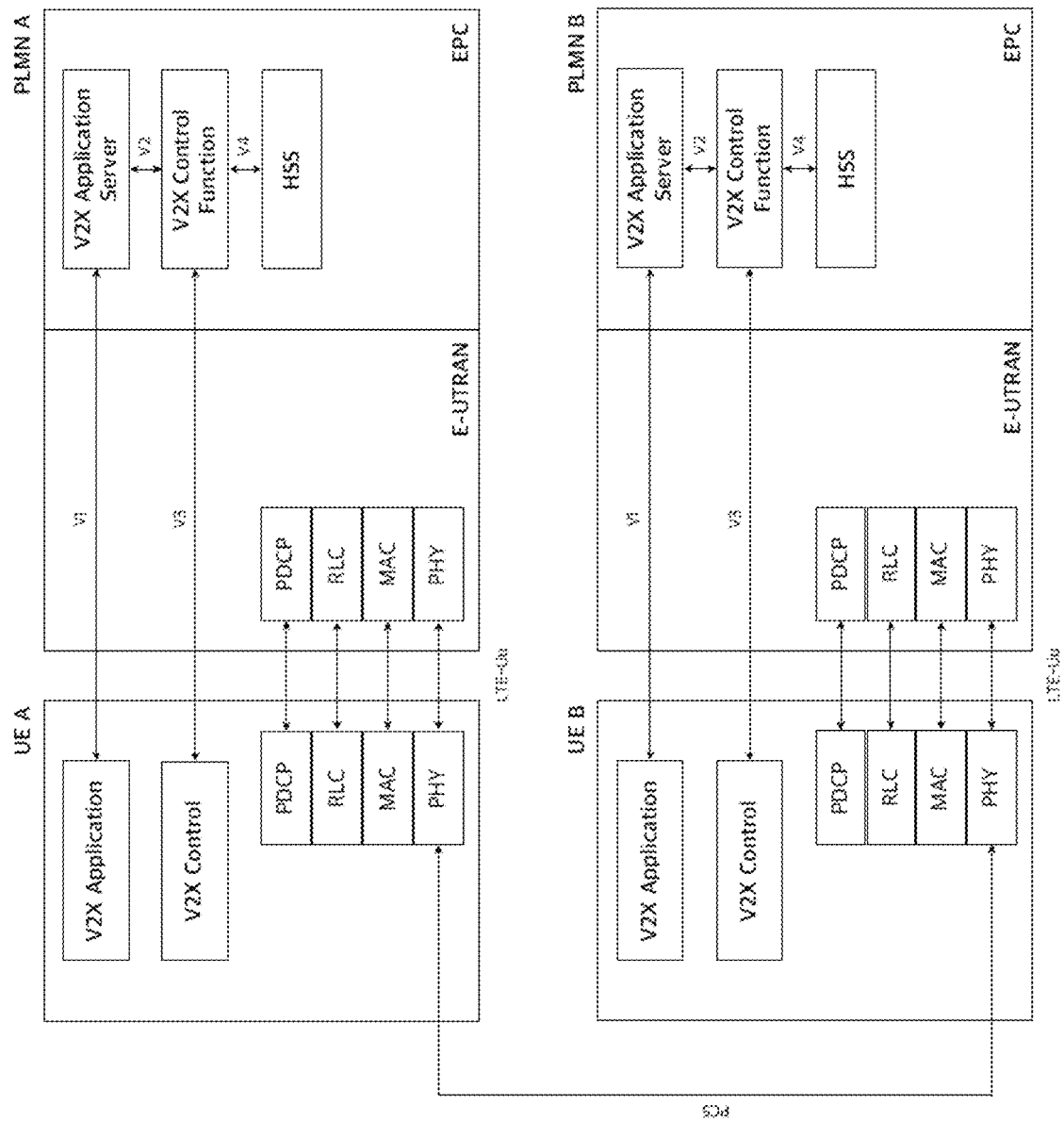
FIG. 1 shows a schematic diagram illustrating V2X sidelink communication related functional entities and interfaces in accordance with the 3GPP Release 14 V2X sidelink communication specifications.

FIG. 1 shows a schematic diagram illustrating V2X sidelink communication related functional entities and interfaces in accordance with the 3GPP Release 14 V2X sidelink communication specifications. As can be taken from FIG. 1, the V2X related functions in 3GPP Rel-14 can be split into core network (EPC) functions and radio access network (E-UTRAN) functions (RRC, MAC, PHY), which will be described in more detail further below. V2X related core network functions in the evolved packet core (EPC) are distributed among V2X control function, V2X application server, and home subscriber server (HSS).

The V2X control function is used to provision the UE (via the V3 reference point) with the necessary PLMN specific parameters in order to use V2X communication in a specific PLMN as well as parameters that are needed when the UE is not served by E-UTRAN. This includes configuration of parameters such as destination Layer-2 IDs, radio resource parameters, and V2X Application Server address information. These parameters can also be preconfigured in the UE for out-of-coverage operation. The V2X Application Server can, among other functions, receive uplink data from the UE and/or deliver data to the UE(s) in a target area. The home subscriber server (HSS) provides the UE with authorization information to perform V2X sidelink communication to the mobility management entity (MME) as subscription information, which in turn is provided to the eNB as part of the UE context information. In addition, the HSS provides a list of PLMNs where the UE is authorized to perform V2X sidelink communication to V2X control function [see, 3GPP, "Architecture enhancements for V2X services (Release 14)," TS 23.285 V14.1.0 (2016-12)].

In the following, two RRC related procedures for V2X sidelink communication in accordance with the 3GPP Release 14 V2X sidelink communication specifications are described.

The information element (IE) named SystemInformationBlockType21 contains the following common configuration information related to V2X sidelink communication (i.e. sl-V2X-ConfigCommon): v2x-CommTxPoolNormalCommon (list of up to 8 transmit resource pools for normal conditions for transmission in RRC_IDLE); v2x-CommTxPoolExceptional (one transmit resource pool for exceptional conditions (e.g., handover)); v2x-CommRxPool (list of up to 16 receive resource pools); v2x-SyncConfig (synchronization configuration for Sidelink Synchronization Signal (SLSS) transmission); v2x-InterFreqInfoList (list of up to 8 possible carrier frequencies for V2X sidelink communication); v2x-ResourceSelectionConfig (sensing configuration for UE autonomous resource selection); and zoneConfig (zone configuration (length, width, etc.)). Moreover, the v2x-ResourceSelectionConfig includes: probResourceKeep (probability with which the UE keeps the current resource at the end of a resource reselection period); pssch-TxConfigList (a list of up to 16 SL-PSSCH-TxConfig configurations, including synchronization reference type (typeTxSync: gnss, enb, ue); and PSSCH transmission parameters (minMCS-PSSCH, maxMCS-PSSCH, minRB-NumberPSSCH, maxRB-NumberPSSCH, allowedRetxNumberPSSCH), restrictResourceReservationPeriodList (list of up to 16 values allowed for the resource reservation interval), and thresPSSCH-RSRP-List (list of 64 threshold values used when excluding resources).

The IE SL-CommResourcePoolV2X specifies parameters for a specific resource pool, including: sl-Subframe (the bitmap used to determine the TTIs belonging to the resource pool); adjacencyPSCCH-PSSCH (whether a UE shall transmit PSCCH and PSSCH in adjacent RBs); sizeSubchannel (number of PRBs of each subchannel in the corresponding resource pool); numSubchannel (number of subchannels in the corresponding resource pool); startRB-Subchannel (lowest PRB index of the subchannel with the lowest index); startRB-PSCCH-Pool (lowest PRB index of the PSCCH pool); dataTxParameters (parameters for sidelink power control); and zoneID (zone identity for which the UE shall use this resource pool).

When the UE receives RRCConnectionReconfiguration including sl-V2X-ConfigDedicated, it performs the following dedicated configuration procedure.

If commTxResources is set to scheduled, the UE requests E-UTRAN to assign transmission resources based on sidelink specific Buffer Status Reports (Sidelink BSR) from the UE. commTxResources also specifies the resource pool (v2x-SchedulingPool) and modulation and coding scheme (mcs) to be used by the UE. Within the allocated pool, the specific resources for PSSCH transmission are determined based on the content of the SL Grant received via DCI format 5A.

If commTxResources is set to ue-Selected, the UE transmits V2X sidelink data based on sensing using one of the resource pools indicated by v2x-commTxPoolNormalDedicated. The sensing configuration is specified in v2x-CommTxPoolSensingConfig.

In scheduled mode, if semi-persistent scheduling (SPS) is enabled, an sl-SPS-RNTI is included in commTxResources. Each SL SPS configuration SPS-ConfigSL is specified by the following parameters: sps-ConfigId, semiPersistSchedIntervalSL (time interval between consecutive transmission opportunities), sidelinkReleaseAfter (number of consecutive unused transmission opportunities before implicit release), and trafficType (priority).

A RRC_CONNECTED UE sends a SidelinkUEInformation message to the serving cell in order to request assignment of dedicated sidelink resources. The SidelinkUEInformation message includes the following information: v2x-CommRxInterestedFreq indicates the index of the frequency (in v2x-InterFreqInfoList broadcast in SystemInformationBlockType21) on which the UE is interested to receive V2X sidelink communication. The V2X sidelink communication transmission resource request (v2x-CommTxResourceReq) includes: v2x-CommTxFreq indicating the index of the frequency on which the UE is interested to transmit V2X sidelink communication (same value as indicated in v2x-CommRxInterestedFreq); and v2x-DestinationInfoList containing a list of up to 16 Destination Layer-2 IDs for V2X sidelink communication.

A UE in coverage which has V2X sidelink data to be transmitted operates in one of the following ways.

If the UE is in RRC_CONNECTED, it requests the E-UTRAN to assign dedicated resources for transmission, if commTxResources is set to scheduled. Otherwise, i.e. if commTxResources is set to ue-Selected, the UE transmits based on sensing using one of the resource pools indicated by v2x-commTxPoolNormalDedicated.

If the UE is in RRC_IDLE it transmits based on sensing using one of the resource pools indicated by v2x-CommTxPoolNormalCommon.

When out of coverage, the UE transmits V2X sidelink data based on sensing using one of the resource pools indicated by v2x-CommTxPoolList in SL-V2X-Preconfiguration.

For V2X sidelink communication transmission pool selection the UE only uses the resource pool which corresponds to its geographical coordinates, if zoneConfig is included in SystemInformationBlockType21 or in SL-V2X-Preconfiguration. The UE determines an identity of the zone in which it is located, based on the following zoneConfig parameters: zoneLength L, zoneWidth W, zoneIdLongiMod Nx, and zoneIdLatiMod Ny.

Figure 2:
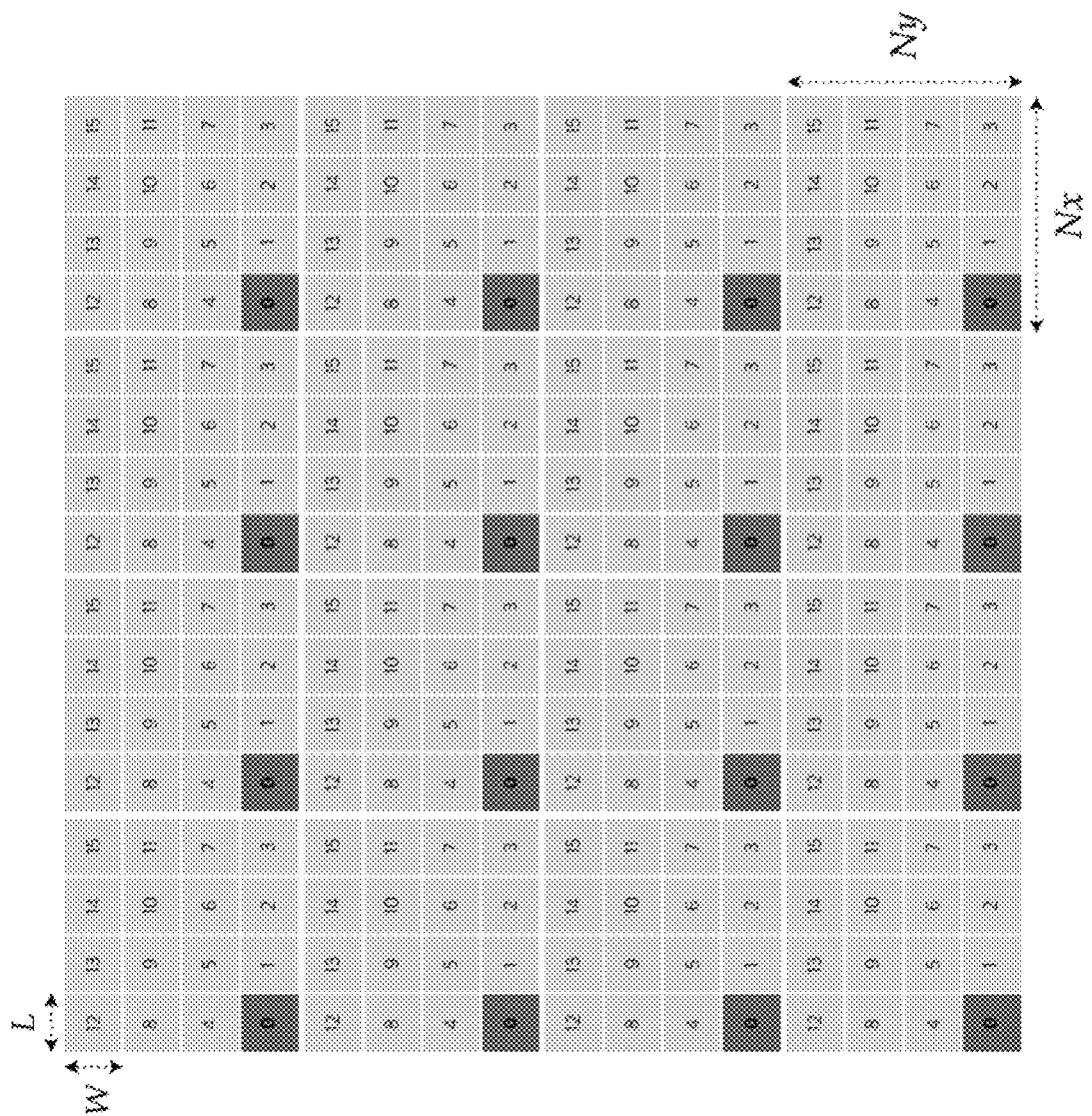
FIG. 2 illustrates an exemplary zone configuration in accordance with the 3GPP Release 14 V2X sidelink communication specifications.

The UE selects a pool of resources which includes a zoneID equal to the calculated zone identity. FIG. 2 shows an example of a zone configuration with $N_x=N_y=4$.

For V2X sidelink related measurement configuration and reporting RRCConnectionReconfiguration is used to configure (measConfig) which measurements should be performed by the UE in relation to V2X sidelink communication as well as the reporting configuration (reportConfig), e.g., how often they should be reported (reportInterval) and whether location information should be included (includeLocationInfo). The MeasurementReport message includes the measurement results (measResults), e.g., the geographic location (locationInfo) of the wireless communication device.

For MAC related procedures for V2X sidelink communication in accordance with the 3GPP Release 14 V2X sidelink communication specifications, in order to transmit on the Sidelink Shared Channel (SL-SCH), the corresponding MAC entity must have at least one SL Grant. New transmissions and retransmissions are performed on the resource indicated in the SL Grant and with the MCS configured by upper layers or selected by the UE between minMCS-PSSCH and maxMCS-PSSCH.

For scheduled resource allocation in sidelink transmission mode 3, the SL Grant is derived from the DCI format 5A received on PDCCH from the eNB, containing the following information: carrier indicator; lowest index of the subchannel allocation of the initial transmission ($L_{out}$); frequency resource location of initial transmission and retransmission, indicated by a resource indication value (RIV); time gap between initial transmission and retransmission ($SF_{gap}$); SL SPS configuration index (SPS case) and activation/release indication (SPS case).

If the MAC entity is configured with at least one SL SPS configuration and the received SL Grant has been received on the PDCCH for the MAC entity's SPS C-RNTI, the MAC entity (re-)initializes the configured SL Grant and considers sequentially that the/Val grant occurs in the subframe for which:

$$(10 \cdot SFN + \text{sub frame}) = [(10 \cdot SFN_{start\ time} + \text{subframe}_{start\ time}) + N \cdot \text{semiPersistSchedIntervalSL}] \text{ modulo } 10240,$$

wherein $SFN_{start\ time}$ and $\text{subframe}_{start\ time}$ correspond to the (re-)initialization time. The MAC entity clears the configured SL Grant immediately after sidelinkReleaseAfter number of consecutive unused transmission opportunities on the associated SPS configuration.

For UE autonomous resource selection in sidelink transmission mode 4, the UE (re)selects PSSCH resources autonomously and semi-persistently based on channel sensing. At the end of each reselection period, the UE keeps the previously selected resource with a probability probResourceKeep. If the UE does not keep the previously selected resource, the UE: selects the number of retransmissions (0 or 1) as configured in allowedRetxNumberPSSCH; selects an amount of frequency resources (number of contiguous subchannels $L_{subCH}$) within the range configured by upper layers between minRB-NumberPSSCH and maxRB-NumberPSSCH; and sets the resource reservation interval $P_{rsvp\_TX}$ to one of the allowed values configured by upper layers in restrictResourceReservationPeriod. The UE then randomly selects a resource and uses it to select a set of periodic resources spaced by the resource reservation interval.

A candidate resource is defined as a set of $L_{sub\_CH}$ contiguous subchannels in a given TTI. Any set of $L_{subCH}$ contiguous subchannels in the PSSCH resource pool within a certain time window (so as to fulfil the latency requirement) corresponds to a candidate resource. The UE excludes resources for which either it has no measurement information or which are reserved by nearby UEs and the associated PSSCH-RSRP is above a certain (priority-dependent) threshold. From the remaining resources, it selects from the best resources in terms of S-RSSI.

If retransmissions are enabled, the UE follows the same procedure to select a set of periodic resources for retransmissions. The UE may also reselect a resource at any time if the data available for transmission does not fit in the selected resource.

In sidelink transmission mode 3, a sidelink buffer status reporting (Sidelink BSR) procedure is used to provide the serving eNB with information about the amount of SL data available for transmission.

RRC controls BSR reporting for SL by configuring the relevant timers. Each sidelink logical channel belongs to a ProSe Destination and is allocated to a Logical Channel Group (LCG) depending on its priority and the mapping between LCG ID and priority provided by upper layers in logicalChGroupInfoList.

For each reported group, Sidelink BSR MAC control elements consist of: destination index, LCG ID and buffer size (bytes).

In the following, a summary of PHY related procedures for V2X sidelink communication is provided.

For determining a PSSCH resource pool the set of TTIs that may belong to a PSSCH resource pool for sidelink transmission mode 3 or 4 is specified as part of the resource pool configuration by means of a bitmap.

The PRB (physical resource blocks) pool consists of $N_{subCH}$ subchannels, where $N_{subCH}$ is given by a higher layer parameter numSubchannel, where subchannel m consists of a set of $n_{subCHsize}$ contiguous PRBs (sizeSubchannel). The starting PRB number for the resource pool is specified by a higher layer parameter startRBSubchannel.

For determining a PSCCH resource pool there are two possible ways of transmitting PSCCH: adjacent and non-adjacent to the PSSCH. Which one is used is part of the resource pool configuration, as specified by the parameters adjacencyPSCCH-PSSCH and startRBPSCCHPool.

The set of TTIs and PRBs for PSSCH transmission is determined by the resource used for the PSCCH transmission containing the associated SCI format 1, and:

Frequency resource location of the initial transmission and retransmission given by a resource indication value (RIV) corresponding to a starting subchannel index ($n_{subCH}^{start}$) and a length in terms of contiguously allocated subchannels ($L_{subCH} \geq 1$); and Retransmission related parameters (e.g., time gap between initial transmission and retransmission field ($SF_{gap}$), retransmission index).

In sidelink transmission mode 4, the selected resource for PSSCH transmission is semi-persistent, with a resource reservation interval $P_{rsvp\_TX}$ determined by higher layers.

For determining TTIs and PRBs for PSCCH SCI format 1 is transmitted in two PRBs in each TTI where the corresponding PSSCH is transmitted.

The following information is transmitted by means of SCI format 1: Priority, Modulation and coding scheme, Resource reservation interval, Frequency resource location of initial transmission and retransmission given by a resource indication value (RITC) and Retransmission related parameters (e.g., time gap between initial transmission and retransmission field ($SF_{gap}$), retransmission index).

Figure 3A:
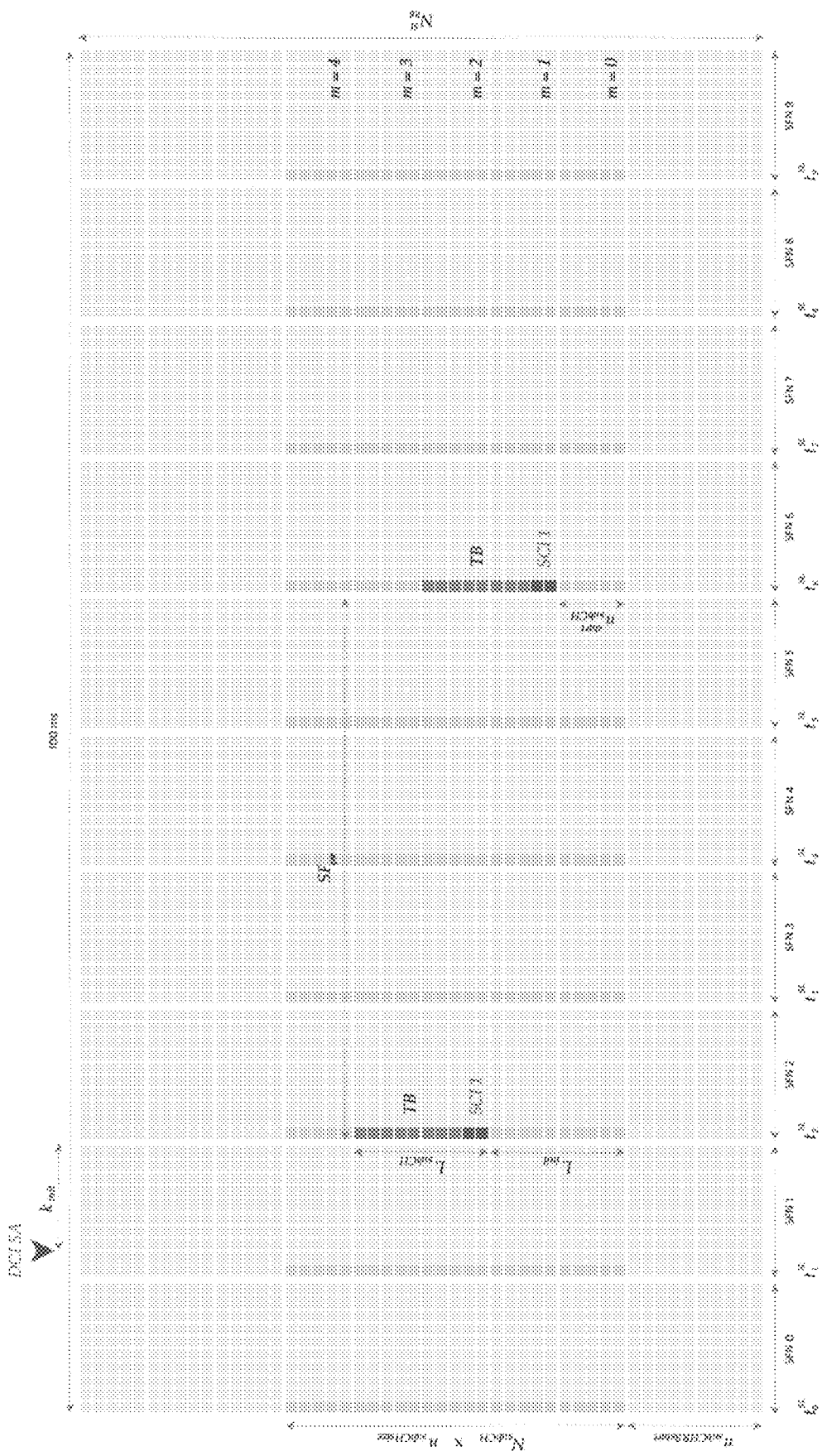
FIGS. 3a and 3b illustrate exemplary locations of PSCCH and PSSCH resources for sidelink transmission mode 3 with adjacent and non-adjacent PSCCH/PSSCH resources, respectively.
Figure 3B:
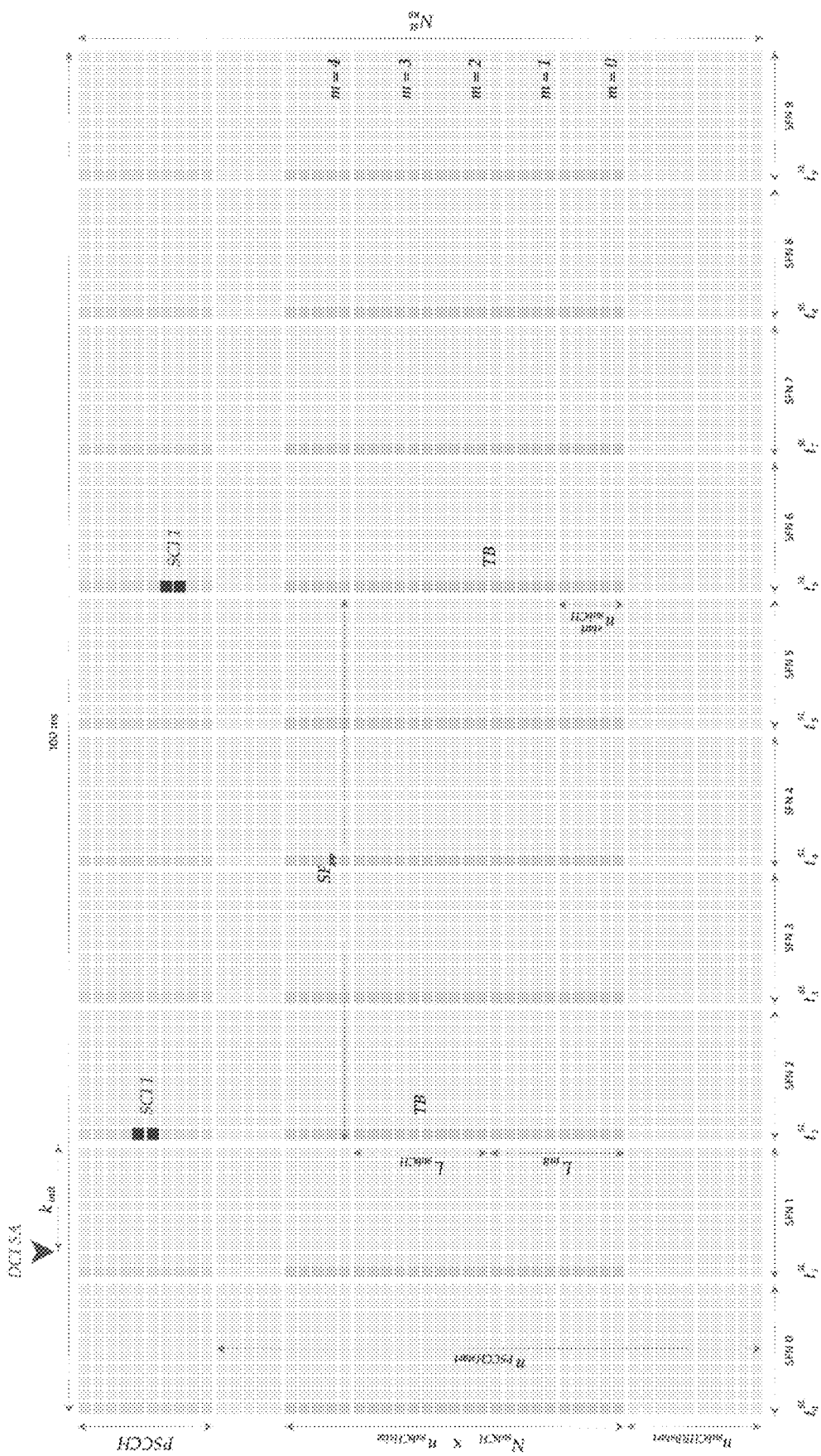

FIGS. 3a and 3b illustrate an example of the location of PSCCH and PSSCH resources, with adjacent and non-adjacent PSCCH/PSSCH resources respectively.

For V2X synchronization there are three types of synchronization reference, namely eNB, UE and GNSS (global navigation satellite system). In case GNSS is configured as synchronization source, the UE utilizes the universal time coordinated (UTC) time to calculate the direct frame number (DFN) and the subframe number. In case the eNB timing is configured as synchronization reference to the UE for dedicated carrier for V2X, the UE follows PCell (RRC_CONNECTED)/serving cell (RRC_IDLE) for synchronization and DL measurements.

Figure 4:
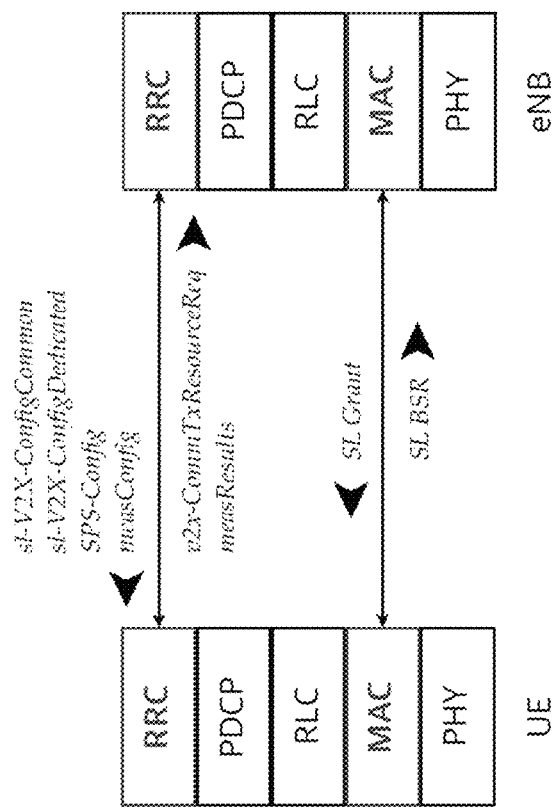
FIG. 4 shows a schematic diagram summarizing RRC and MAC signaling in accordance with the 3GPP Release 14 V2X sidelink communication specifications.

FIG. 4 provides a summary of the above-described RRC and MAC signaling procedures in accordance with the 3GPP Release 14 V2X sidelink communication specifications. As can be taken from FIG. 4, in terms of RRC signaling, V2X sidelink communication in accordance with the 3GPP Release 14 V2X sidelink communication specifications relies on the following Information Elements (IEs). For Mode-4 operation: sl-V2X-ConfigCommon. For Mode-3 operation: sl-V2X-ConfigDedicated; SPS-Config; measConfig; v2x-CommTxResourceReq; and measResults. For mode-3, additionally the following MAC signaling is required: SL Grant and SL BSR.

Figure 5:
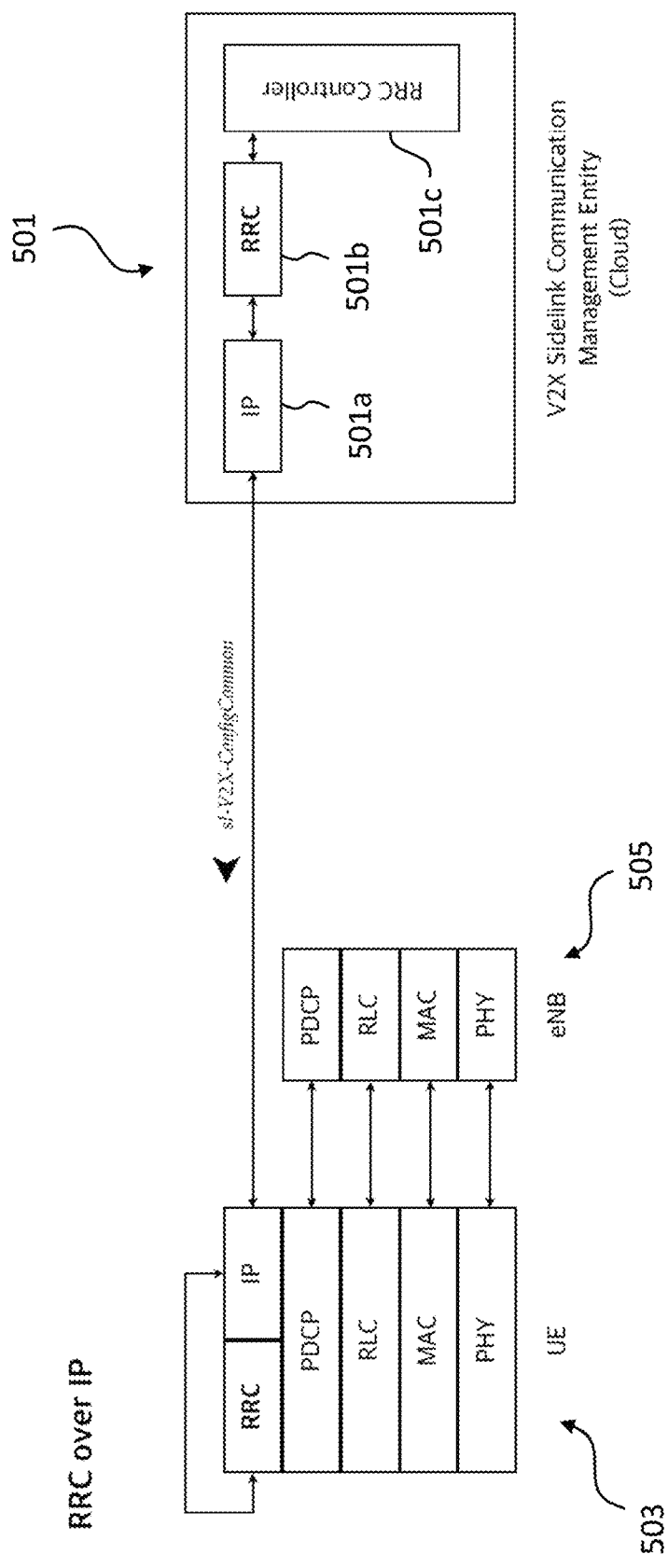
FIG. 5 shows a schematic diagram illustrating an apparatus for managing V2X sidelink communications according to an embodiment in communication with a UE according to an embodiment.

FIG. 5 shows a schematic diagram illustrating an apparatus 501 for managing V2X sidelink communications according to an embodiment in communication with a UE 503 according to an embodiment. As will be described in more detail further below, the apparatus 501, which in FIG. 5 is referred to as a V2X sidelink communication management entity (SCME) and could be implemented, for instance, on a cloud server, is configured to transmit and/or receive control plane signaling related to the control of radio resources of a sidelink communication system to/from the UE 503, wherein the control plane signaling is carried over a user plane, in particular through IP encapsulation, of a second communication system, which is located between the apparatus 501 and the UE 503 and exemplified in FIG. 5 by the eNB 505.

Embodiments of the invention are based on two different schemes to manage V2X sidelink communication (in particular, RAN functions (RRC and MAC)) by the apparatus, 501, namely the third-party PLMN-independent Sidelink Communication Management Entity (SCME), with minimal or no impact on the UE 503 by making beneficial use of 3GPP standard control signaling for V2X sidelink communication:

In the first scheme, which is based on RRC/MAC over IP, the apparatus 501 can perform all RRC/MAC functions related to V2X sidelink communication. Standard RRC/MAC control signaling messages related to V2X sidelink communication are IP encapsulated/decapsulated and transmitted/received to/from the UE 503. This has the benefit of not requiring a bilateral agreement between the PLMN controlling the RAN 505 and the provider of the apparatus 501. However, it introduces a slight additional overhead due to the use of IP headers for encapsulation.

In a second scheme, which is based on a RRC/MAC control interface, the apparatus 501 is granted direct access to the PLMN's RAN, e.g. the eNB 505 shown in FIG. 5, via an external RRC/MAC control interface at the eNB 505. This has the benefit of having no impact whatsoever on the UE 503 and avoids IP header overhead. However, it requires a bilateral agreement between the PLMN and the provider of the apparatus 501.

In the following, embodiments of the invention based on the above first or second scheme will be described in more detail.

In the first scheme, which can be referred to as "RRC/MAC over IP" or more specifically "IP encapsulation of standard RRC/MAC signaling related to V2X sidelink communication", all RRC/MAC functions related to V2X sidelink communication can be moved from the eNB 505, i.e. the PLMN operator, to the apparatus 501. The apparatus 501 makes use of the PLMN's radio interface to the UE 503 in order to establish an IP communication link with the UE 503 to exchange standard RRC/MAC control signaling messages, as shown in FIGS. 5 and 6, wherein FIG. 5 shows an embodiment for mode-4 operation and FIG. 6 shows an embodiment for mode-3 operation.

As shown in FIG. 5, in an embodiment configured for mode-4 operation, the apparatus 501 can comprise the following structural and/or functional elements: a RRC controller 501c in charge of controlling mode-4 configuration parameters (e.g., resource pools, zones, etc.); a RRC entity 501b in charge of generating standard configuration information elements for V2X sidelink communication (such as sl-V2X-ConfigCommon); and an IP entity 501a in charge of encapsulating the standardized configuration information elements (sl-V2X-ConfigCommon) within an IP packet and transmitting it to the UE 503 over IP.

Figure 6:
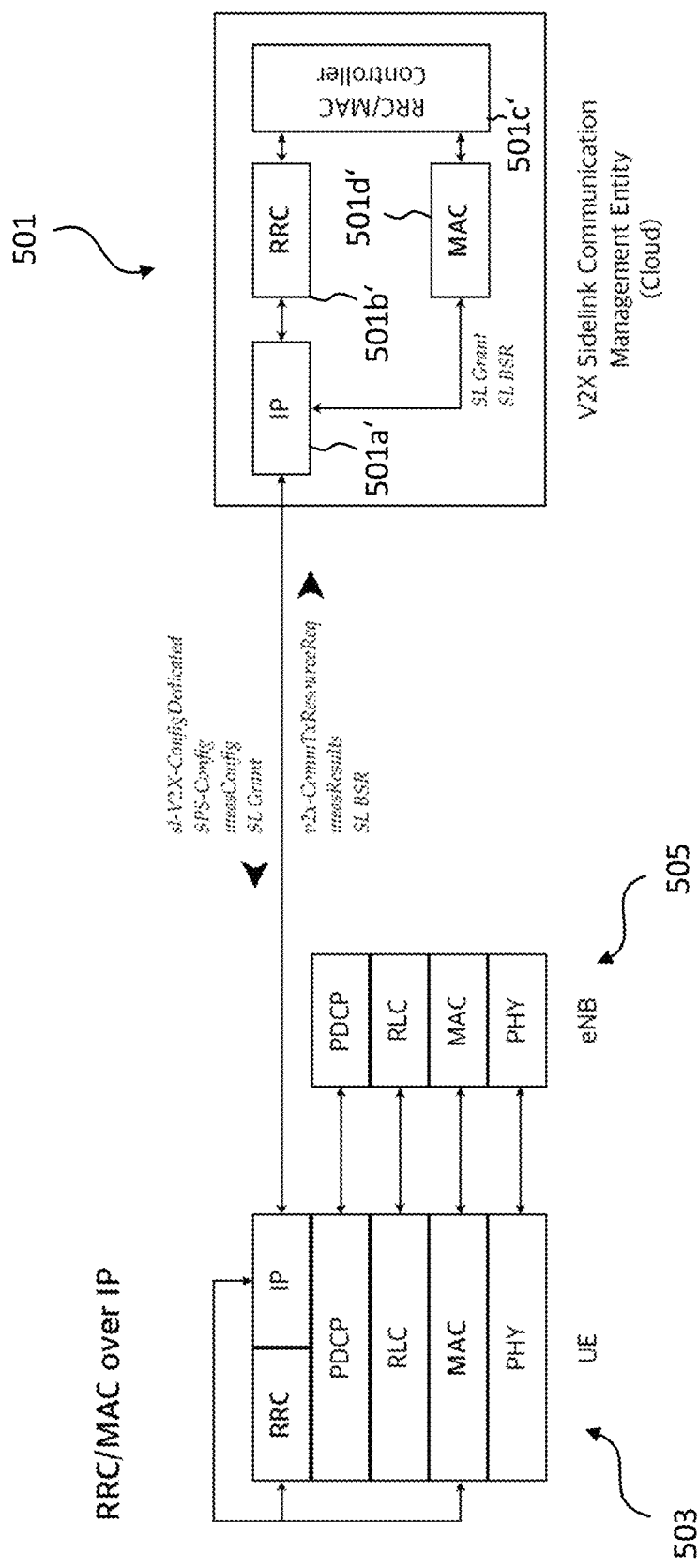
FIG. 6 shows a schematic diagram illustrating an apparatus for managing V2X sidelink communications according to an embodiment in communication with a UE according to an embodiment.

As shown in FIG. 6, in an embodiment configured for mode-3 operation, the apparatus 501 can comprise the following structural and/or functional elements: a RRC/MAC controller 501c'; a RRC entity 501b'; a MAC entity 501d' and an IP entity 501a'.

In an embodiment, the RRC/MAC controller 501c' of the apparatus 501 shown in FIG. 6 can comprise a V2X sidelink scheduler configured to control mode-3 configuration parameters, such as dedicated configuration for V2X sidelink communication, SPS configuration and measurement configuration. Moreover, the V2X Sidelink Scheduler can be configured to select sidelink radio resources based on information received from the RRC entity 501b' (v2x-CommTxResourceReq, measResults) and the MAC entity 501d' (SL BSR).

The RRC entity 501b' of the apparatus 501 shown in FIG. 6 is configured to generate standard configuration information elements for V2X sidelink communication (sl-V2X-ConfigDedicated, SPS-Config, measConfig) from information generated by the RRC/MAC controller 501c' and to provide to the RRC/MAC controller 501c' information derived from received V2X sidelink communication related messages from the UE 503, such as v2x-CommTxResourceReq and measResults.

The MAC entity 501d' of the apparatus 501 shown in FIG. 6 is configured to provide buffer status information derived from received SL BSR to the RRC/MAC controller 501c' (or more specifically its V2X sidelink scheduler), and to generate standard SL Grants based on sidelink radio resource allocation information received from the RRC/MAC controller 501c' (or more specifically its V2X sidelink scheduler).

The IP entity 501a' of the apparatus 501 shown in FIG. 6 is in charge of IP encapsulation and/or decapsulation of RRC and MAC messages related to V2X sidelink communication.

Since the SL BSR MAC Control Element can no longer be transmitted as MAC control signaling within a MAC PDU over the PLMN's RAN interface (uplink), according to an embodiment the MAC entity in the UE 503 delivers the SL BSR MAC Control Element to the IP layer in the UE 503, which encapsulates this information within an IP packet and transmits it to the IP layer in the apparatus 501. Upon reception, the IP unit or layer 501a' in the apparatus 501 decapsulates the SL BSR MAC Control Element and delivers it to the MAC entity 501d' in the apparatus 501.

Since the SL Grant can no longer be transmitted as PHY control signaling (DCI format 5A) over the PLMN's RAN interface, according to an embodiment it is encapsulated within an IP packet by the IP unit or layer 501a' in the apparatus 501 and transmitted to the IP layer in the UE 503. Upon reception, the IP layer decapsulates the SL Grant and delivers it to the MAC entity in the UE 503.

According to an embodiment, the offset (DFN and subframe number) relative to subframe #0 of DFN0 can be also included in the IP packet. The IP layer in the UE 503 decapsulates the IP packet and delivers the SL Grant and the offset (DFN and subframe number) to its MAC sublayer.

Similar to the UE 503, the apparatus 501 can utilize the UTC time to calculate the Direct Frame Number (DFN) and subframe number (e.g., from a GNSS synchronization source) according to the procedure specified for the UE in Section 5.10.14 of the standard specification 3GPP TS 36.331.

In order to indicate the destination layer (RRC or MAC) to which the information should be delivered, implicit TCP or UDP port mapping can be used according to an embodiment. If no transport layer protocol is used, the destination layer can be identified by using different scrambling codes for the IP header checksum.

Figure 7:
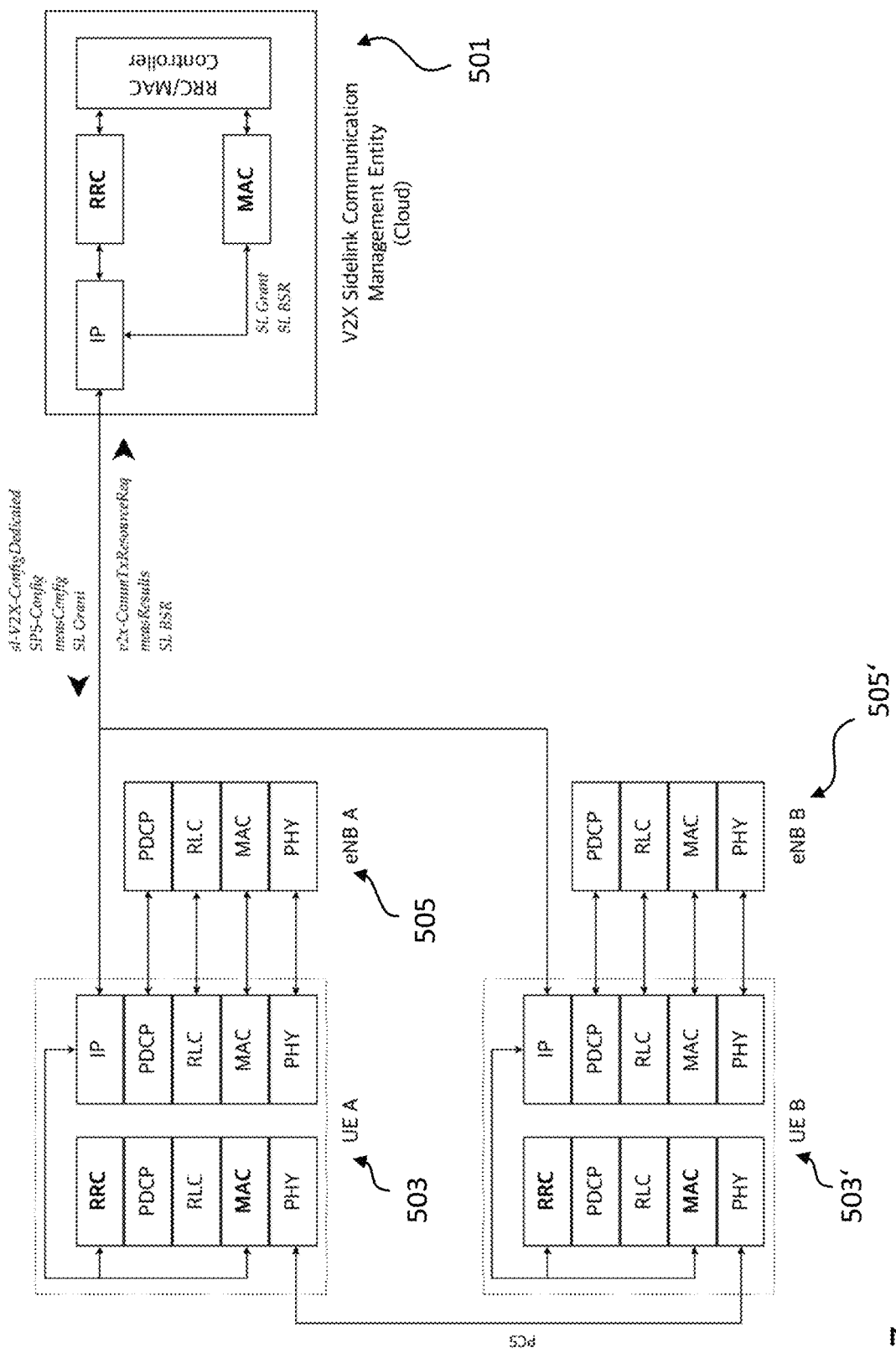
FIG. 7 shows a schematic diagram illustrating an apparatus for managing V2X sidelink communications according to an embodiment in communication with a dual-stack UE according to an embodiment.

According to an embodiment, the UE 503 can be implemented as a single-stack UE, as shown in FIGS. 5 and 6, or as a dual-stack UE comprising a first UE stack 503 and a second UE stack 503', as shown in the embodiment of FIG. 7.

Figure 8:
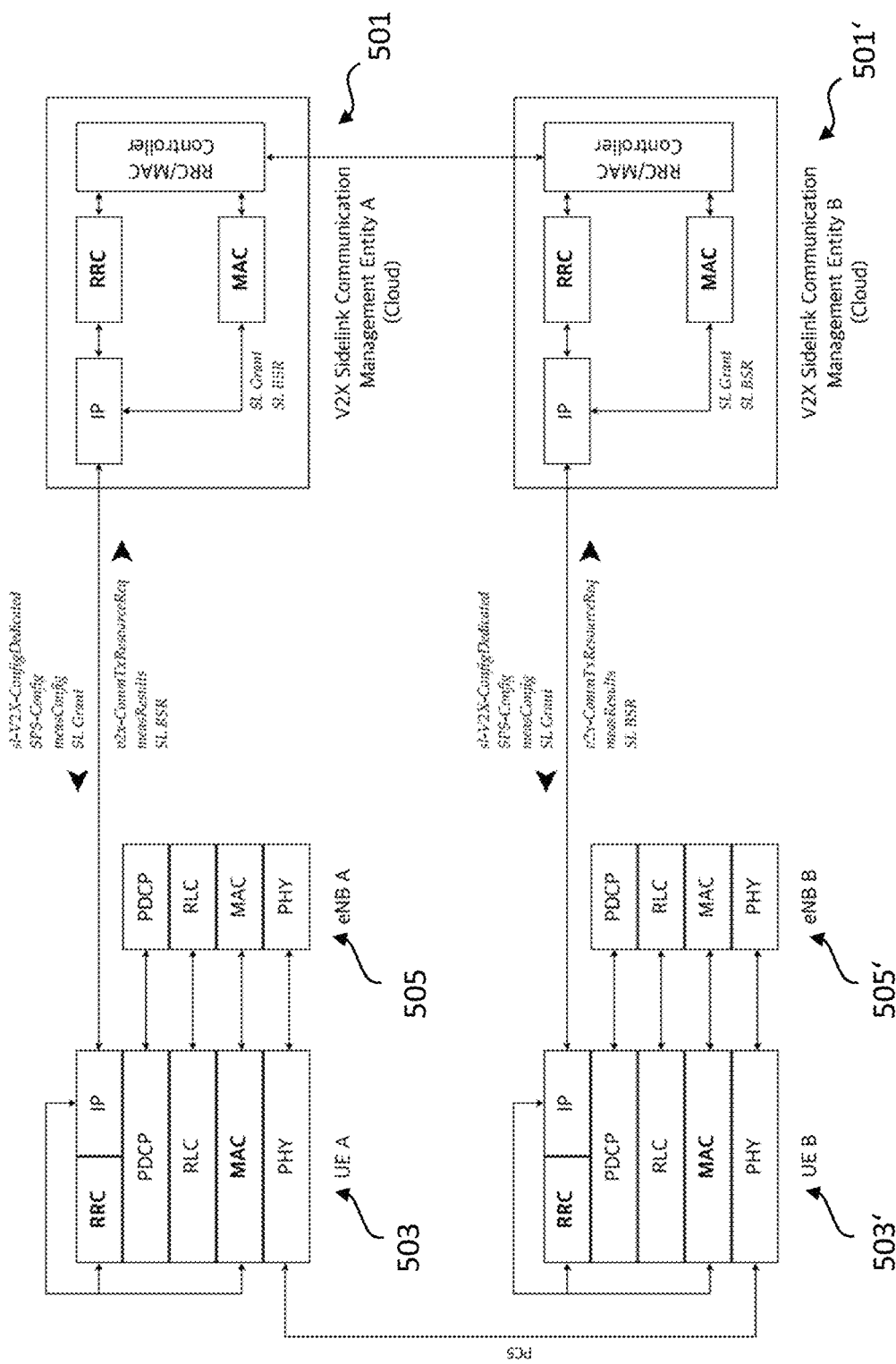
FIG. 8 shows a schematic diagram illustrating a distributed apparatus for managing V2X sidelink communications according to an embodiment in communication with a UE according to an embodiment.

According to an embodiment, the apparatus 501 can be implemented as a centralized entity, such as a single cloud server, or multiple distributed entities, such as a first cloud server 501 and a second cloud server 501', as shown in the embodiment of FIG. 8. In case the apparatus 501 is implemented as a distributed system, each distributed network entity 501, 501' can be located close to the edge of the mobile network operator, in particular close to the RAN 505 so that the core network of the PLMN can be bypassed in order to reduce the end-to-end communication latency between the UE 503 and the apparatus 501, 501'. In this case, each distributed network entity 501, 501' can communicate with other neighboring distributed network entities so as to coordinate V2X sidelink related RRC/MAC control functionalities. In order to bypass the CN of the PLMN 505, any of a plurality of local breakout approaches can be used (e.g., Local IP Access (LIPA), Selected IP Traffic Offload (SIPTO), and/or mobile edge computing (MEC), etc).

In the second scheme, which can be referred to as "RRC/MAC control interface" or more specifically "External RRC/MAC control interface at eNB for V2X sidelink communication", the apparatus 501 controls RRC/MAC functions related to V2X sidelink communication at the PLMN via an external RRC/MAC control interface at the eNB 505. In an embodiment, the apparatus 501 comprises a RRC/MAC Controller configured to control RRC and MAC functions related to V2X sidelink communication.

Figure 9:
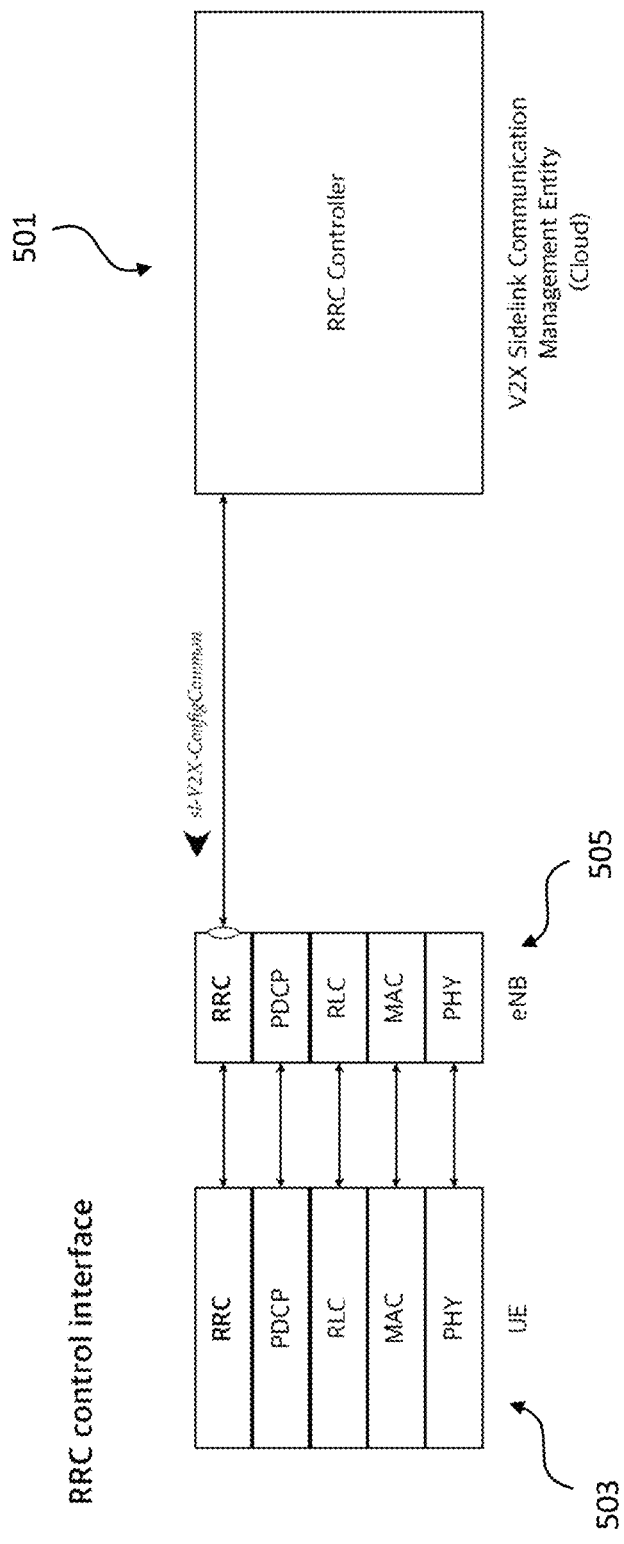
FIG. 9 shows a schematic diagram illustrating an apparatus for managing V2X sidelink communications according to an embodiment in communication with a UE according to an embodiment.

In an embodiment for mode-4 operation, the RRC/MAC controller of the apparatus 501 interfaces only the RRC layer of the eNB 505, as illustrated in FIG. 9. Thus, the RRC/MAC controller is configured to interface the RRC layer of the eNB to configure V2X sidelink communication related RRC parameters, such as sl-V2X-ConfigCommon.

Figure 10:
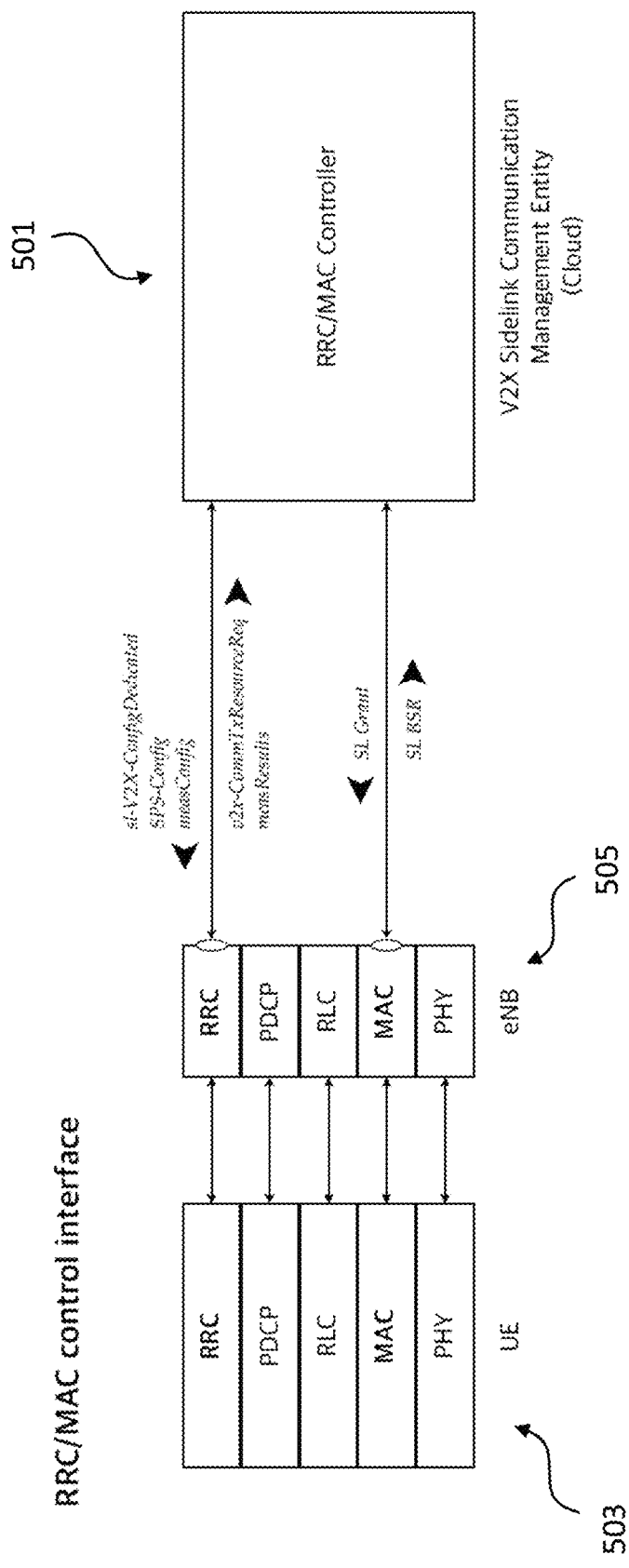
FIG. 10 shows a schematic diagram illustrating an apparatus for managing V2X sidelink communications according to an embodiment in communication with a UE according to an embodiment.

In an embodiment for mode-3 operation, the RRC/MAC controller of the apparatus 501 interfaces both the RRC layer and the MAC sublayer of the eNB 505, as illustrated in FIG. 10, and can further comprise a V2X sidelink scheduler. The RRC/MAC controller of the apparatus 501 shown in FIG. 10 interfaces the RRC layer of the eNB 505 to configure and receive V2X sidelink communication related RRC messages, such as sl-V2X-ConfigDedicated, SPS-Config, measConfig, v2x-CommTxResourceReq and measResults. Thus, the RRC/MAC controller of the apparatus 501 provides a RRC control interface for V2X sidelink communication. The RRC/MAC controller of the apparatus 501 shown in FIG. 10 interfaces the MAC sublayer of the eNB 505 to receive buffer size information derived from SL BSR and trigger the transmission of SL Grants (via DCI format 5A) containing the specific sidelink radio resources allocated by the V2X Sidelink Scheduler. Thus, the RRC/MAC controller of the apparatus 501 provides a MAC control interface for V2X sidelink communication.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An apparatus, comprising:
a processor; and
a memory having processor-executable instructions stored thereon, which, when executed by the processor, cause the apparatus to:
transmit and/or receive a control plane signaling related to control of radio resources of a sidelink communication system to/from a user equipment (UE), wherein the control plane signaling is Internet Protocol (IP) encapsulated and/or decapsulated and carried over a user plane of a second communication system between the apparatus and the UE;
encapsulate a standardized configuration information element for vehicle-to-everything (V2X) sidelink communication within an IP packet; and
transmit the IP packet to the UE.

2. The apparatus of claim 1, wherein the instructions, when executed by the processor, further cause the apparatus to have access to address information of the UE, and/or the apparatus has the address information of the UE.

3. The apparatus of claim 2, wherein the address information of the UE comprises information on one or more service access points of a radio resource control (RRC) of the UE.

4. The apparatus according to claim 2, wherein the address information of the UE is comprised in a pre-defined header format, including at least one of the group consisting of: an IP header, a user datagram protocol (UDP) header, and a transmission control protocol (TCP) header.

5. The apparatus of claim 2, wherein the address information of the UE comprises an identifier for identifying a subsystem of the UE.

6. The apparatus of claim 1, further comprising a transceiver,
wherein the processor is configured to cooperatively operate with the transceiver to transmit and/or receive control plane signaling from/to the UE over a user plane of a third communication system.

7. The apparatus of claim 1, further comprising:
a radio resource control (RRC) unit configured to generate a standard configuration information element for V2X sidelink communication; and
a RRC controller configured to control a mode-4 configuration parameter.

8. An apparatus, comprising:
a processor; and
a memory having processor-executable instructions stored thereon, which, when executed by the processor, cause the apparatus to:
transmit and/or receive a control plane signaling related to control of radio resources of a sidelink communication system to/from a user equipment (UE), wherein the control plane signaling is Internet Protocol (IP) encapsulated and/or decapsulated and carried over a user plane of a second communication system between the apparatus and the UE;
control a mode-3 configuration parameter;
generate a standard configuration information element for vehicle-to-everything (V2X) sidelink communication from information generated by an RRC/MAC controller;
provide to the RRC/MAC controller information derived from a V2X sidelink communication related message received from the UE;
provide buffer status information to the RRC/MAC controller;
generate a standard sidelink grant based on sidelink radio resource allocation information received from the RRC/MAC controller; and
encapsulate and/or decapsulate RRC and MAC messages related to V2X sidelink communication.

9. A method of operating an apparatus, the method comprising:
transmitting and/or receiving a control plane signaling related to control of radio resources of a sidelink communication system to/from a user equipment (UE), wherein the control plane signaling is Internet Protocol (IP) encapsulated and/or decapsulated and carried over a user plane of a second communication system between the apparatus and the UE;
encapsulating a standardized configuration information element for vehicle-to-everything (V2X) sidelink communication within an IP packet; and
transmitting the IP packet to the UE.

10. The method of claim 9, wherein the apparatus has access to address information of the UE, and/or the apparatus has the address information of the UE.

11. The method of claim 10, wherein the address information of the UE comprises information on one or more service access points of a radio resource control (RRC) of the UE.

12. The method according to claim 10, wherein the address information of the UE is comprised in a pre-defined header format, including at least one of the group consisting of: an IP header, a user datagram protocol (UDP) header, and a transmission control protocol (TCP) header.

13. The method of claim 10, wherein the address information of the UE comprises an identifier for identifying a subsystem of the UE.

14. The method of claim 9, further comprising: transmitting and/or receiving control plane signaling from/to the UE over a user plane of a third communication system.

15. The method of claim 9, further comprising:
generating a standard configuration information element for V2X sidelink communication; and
controlling a mode-4 configuration parameter.

16. A method for operating an apparatus, the method comprising:
transmitting and/or receiving a control plane signaling related to control of radio resources of a sidelink communication system to/from a user equipment (UE), wherein the control plane signaling is Internet Protocol (IP) encapsulated and/or decapsulated and carried over a user plane of a second communication system between the apparatus and the UE;
controlling a mode-3 configuration parameter;
generating a standard configuration information element for vehicle-to-everything (V2X) sidelink communication from information generated by an RRC/MAC controller and
providing to the RRC/MAC controller information derived from a V2X sidelink communication related message received from the UE;
providing buffer status information to the RRC/MAC controller;
generating a standard sidelink grant based on sidelink radio resource allocation information received from the RRC/MAC controller; and
encapsulating and/or decapsulating RRC and MAC messages related to V2X sidelink communication.

17. A non-transitory computer-readable medium including computer-executable instructions that, when executed by a processor on an apparatus, facilitate the apparatus carrying out a method for operating the apparatus, the method comprising:
transmitting and/or receiving a control plane signaling related to control of radio resources of a sidelink communication system to/from a user equipment (UE), wherein the control plane signaling is Internet Protocol (IP) encapsulated and/or decapsulated and carried over a user plane of a second communication system between the apparatus and the UE;
encapsulating a standardized configuration information element for vehicle-to-everything (V2X) sidelink communication within an IP packet; and
transmitting the IP packet to the UE.

* * * * *